United States Patent
Sobol et al.

(10) Patent No.: US 8,930,340 B1
(45) Date of Patent: Jan. 6, 2015

(54) BLENDING CONTENT IN AN OUTPUT

(75) Inventors: Alexander Sobol, Los Altos, CA (US);
Andre Rohe, Mountain View, CA (US);
Sangsoo Sung, Palo Alto, CA (US);
Lucian F. Cionca, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/614,353

(22) Filed: Sep. 13, 2012

Related U.S. Application Data

(60) Provisional application No. 61/536,948, filed on Sep. 20, 2011.

(51) Int. Cl.
*G06F 17/30* (2006.01)

(52) U.S. Cl.
CPC ................. *G06F 17/30991* (2013.01)
USPC .......................... 707/706; 707/723

(58) Field of Classification Search
USPC .................................. 707/706, 723
See application file for complete search history.

(56) References Cited

U.S. PATENT DOCUMENTS

| | | | |
|---|---|---|---|
| 7,206,780 B2 * | 4/2007 | Slackman | 1/1 |
| 7,870,117 B1 * | 1/2011 | Rennison | 707/706 |
| 7,930,286 B2 * | 4/2011 | Sue | 707/706 |
| 7,949,642 B2 * | 5/2011 | Yang et al. | 707/706 |
| 7,958,111 B2 * | 6/2011 | Sue | 707/706 |
| 7,958,116 B2 * | 6/2011 | House et al. | 707/723 |
| 7,962,477 B2 | 6/2011 | Hu et al. | |
| 7,966,305 B2 * | 6/2011 | Olsen | 707/706 |
| 8,001,115 B2 * | 8/2011 | Davis et al. | 707/723 |
| 8,019,742 B1 * | 9/2011 | Baluja et al. | 707/706 |
| 8,209,330 B1 * | 6/2012 | Covell et al. | 707/728 |
| 8,331,693 B2 | 12/2012 | Inomata et al. | |
| 8,341,147 B2 | 12/2012 | Hu et al. | |
| 8,370,332 B2 | 2/2013 | Hu et al. | |
| 8,521,734 B2 | 8/2013 | Walther et al. | |
| 8,527,496 B2 | 9/2013 | Wable et al. | |
| 8,560,678 B2 * | 10/2013 | Tseng | 709/224 |
| 2006/0085392 A1 | 4/2006 | Wang et al. | |
| 2007/0237232 A1 | 10/2007 | Chang et al. | |
| 2008/0222119 A1 | 9/2008 | Dai et al. | |
| 2010/0153371 A1 | 6/2010 | Singh | |
| 2010/0306213 A1 | 12/2010 | Taylor et al. | |
| 2011/0004692 A1 | 1/2011 | Occhino et al. | |
| 2011/0264648 A1 | 10/2011 | Gulik et al. | |
| 2013/0013682 A1 | 1/2013 | Juan et al. | |
| 2013/0238613 A1 | 9/2013 | Hu et al. | |

FOREIGN PATENT DOCUMENTS

WO     2008/092039     7/2008

* cited by examiner

*Primary Examiner* — Kim Nguyen

(74) *Attorney, Agent, or Firm* — Fish & Richardson P.C.

(57) ABSTRACT

Techniques include obtaining ranges of content relevance scores for different collections of content; generating a normalized range based on the ranges of content relevance scores; and normalizing a particular range of a particular collection of content including: generating a distribution of content relevance scores for the collection of content; identifying portions in the distribution; and generating a mapping of portions from the distribution to portions in the normalized range.

19 Claims, 8 Drawing Sheets

BLENDING CONTENT IN AN OUTPUT

CROSS-REFERENCE TO RELATED APPLICATION

Priority is hereby claimed to U.S. Provisional Application No. 61/536,948, which was filed on Sep. 20, 2011. The contents of U.S. Provisional Application No. 61/536,948 are hereby incorporated by reference into this disclosure.

BACKGROUND

This disclosure relates generally to blending content in an output.

Search engines identify content (e.g., images, audio, video, Web pages, text, etc.) that is relevant to a user's needs and present information about that content in a manner that is useful to the searcher.

In operation, a search engine receives a search query. The search engine examines items of content in a search index, and generates relevance scores for the items of content. The relevance scores are metrics that are indicative of the relevance of the items of content to the search query. The search engine may also generate a ranking score to rank relevant items of content, e.g., based on their relevance scores and/or other criteria. The ranked content items, or parts thereof, are output as search results that respond to the search query.

Social networks may be searched using a search engine. In the case of social networks, the search results may be presented as part of a member's content stream. In addition to the search results, a member's content stream may include, e.g., content for which the member has not specifically searched.

SUMMARY

Techniques for normalizing relevance scores may include obtaining ranges of content relevance scores for different collections of content; generating a normalized range based on the ranges of content relevance scores; and normalizing a particular range of a particular collection of content. Normalizing may include generating a distribution of content relevance scores for the collection of content; identifying portions in the distribution; and generating a mapping of portions from the distribution to portions in the normalized range.

Obtaining the ranges may include running sample search queries over the different collections of content; receiving relevance scores in response to the sample search queries; and identifying upper and lower bounds of the content relevance scores for each of the different collections of content, where a range of content relevance scores for a corresponding collection of content is between, and inclusive of, values corresponding to the upper and lower bounds of the content relevance scores.

The foregoing techniques may include performing searches of the different collections of content to identify content that is relevant to a search query; determining where, in the normalized range, content relevance scores corresponding to the identified content fall; ranking the identified content based, at least in part, on where the content relevance scores fall in the normalized range; and outputting at least part of the identified content based the ranking.

The foregoing techniques may include obtaining updated ranges of content relevance scores at predetermined time intervals; and updating the normalized range based on the updated ranges. The foregoing techniques may include obtaining updated ranges of content relevance scores based on changes to the different collections of content; and updating the normalized range based on the updated ranges.

The different collections of content may correspond to corpora for at least some of the following: news content, video content, blog content, social networking content, and Web content. The different collections of content may correspond to corpora for at least one of: content from a country, content in a language, content for a demographic group, and content for a gender. At least part of the identified content may include one or more snippets of the identified content.

Techniques for blending content may include identifying content that is relevant to a search query, where the content is from different categories of content, and where each category corresponds to a group of entities who are associated with content for that category; ranking the identified content to produce ranked content, where the ranking is performed based, at least in part, on which category of content includes the identified content; and outputting the ranked content as a response to the search query.

The foregoing techniques may include obtaining a first search result responsive to the search query, where the first search result is associated with a first category; determining a cost of the first search result based on a second search result that is responsive to the search query, where the second search result is associated with a second category that is different from the first category; and determining whether to include the first search result in the ranked content based on the cost. Determining whether to include the first search result in the ranked content may be performed based on a comparison of the score of the first search result and a running score that includes a score of the second search result. The score may be a running score for content added to at least part of the ranked content.

In the foregoing techniques, the second category may correspond to content to which an entity issuing the search query has a social affinity. The different categories may include a first category corresponding to entities who have a social connection to an entity that provided the search query, a second category corresponding to entities having greater than a threshold number of connections on a social graph, and a third category corresponding to entities that do not have a social connection to the entity that provided the search query, where social connection is determined by reference to a social graph of the entity that provided the search query.

The foregoing techniques may include adjusting ranking scores of content from the first category so that content from the first category is more relevant than content from the second category and content from the third category; and adjusting ranking scores of content from the second category so that content from the second category more relevant than content from the third category. Outputting the ranked content may include outputting at least snippets of the ranked content.

The foregoing techniques may include adding, to the ranked content, content from outside of the different categories, where the content from outside of the different categories includes public content that is relevant to the search query. Adding may include maintaining a score that is based on based on values associated with the content from outside of the different categories; and adding, to the ranked content, content from outside of the different categories in a case that the score does not exceed a threshold.

The foregoing techniques may include identifying a point in the ranked content where a ranking score falls below a predefined threshold; determining whether to add content from outside the different categories at the point where the ranking score falls below the threshold; and adding the content based on the determining. Determining whether to add the content may include adding, to a score, a value associated with the content from outside the different categories; comparing the score, with the value added, to a threshold; permitting addition of the content if the score is below the threshold; and prohibiting addition of the content if the score exceeds the threshold.

The content from outside the different categories may be from different collections of content; content relevance scores for the different corpora may be normalized; the content from outside the different categories may be first content and other content from outside the different categories may be second content; and the first content may be determined to have more relevance than the second content based, in part, on the normalized content relevance scores.

Advantages of the foregoing techniques may include enabling content from different corpora to be blended in an output. Additionally, content can be ranked by the group of entity (e.g., social contact, public figure, etc.) who provided the content. As a result, a searcher can be provided with content that is ranked according to entities whose content may be of interest to the searcher.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION

Described herein are techniques for blending content, e.g., from different content corpora (or simply "corpora"), in an output. An output can include, for example, a ranked search results list, a social network content stream, or the like. An example technique includes obtaining ranges of relevance scores for different corpora and normalizing the ranges to produce a normalized range. The normalized range is used in ranking content from the different corpora for output.

Figure 1:
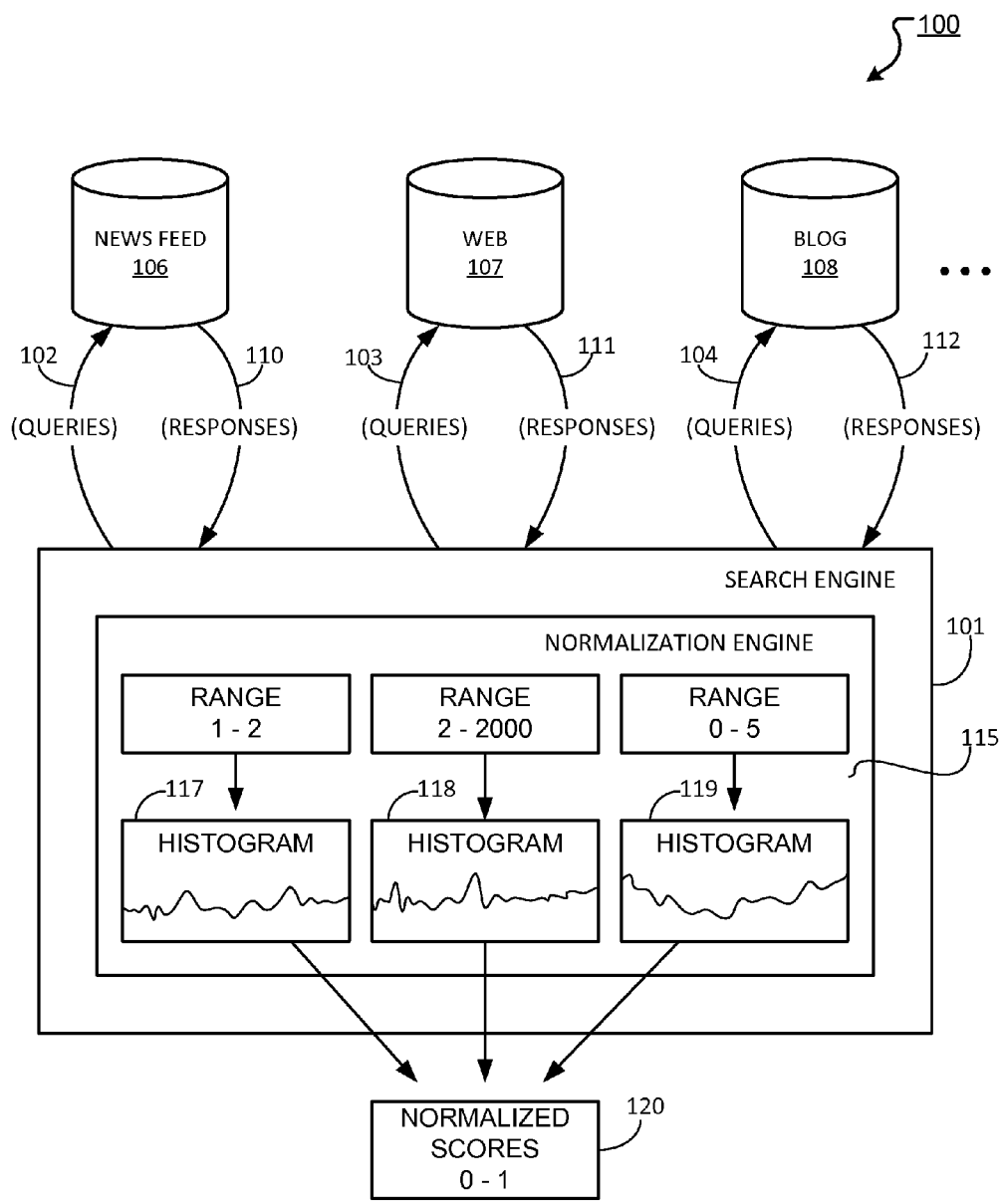
FIG. 1 shows, conceptually, an example system for normalizing relevance scores relevance scores associated with content from corpora of a search index.

FIG. 1 shows, conceptually, an example system 100 for normalizing scores, e.g., relevance scores associated with content from corpora of a search index. In the system of FIG. 1, a search engine 101 issues search queries 102, 103 and 104 to corresponding indexes 106, 107 and 108 of different collections of documents (e.g., corpora). In this implementation, index 106 is a search index for news feeds, index 107 is a search index for World Wide Web (or simply "Web") content, and index 108 is a search index for blogs. The corpora shown in FIG. 1 are examples; other may be used. For example, there may be separate corpora for content from different countries, for content from different regions, for content from different entities, for content in different languages, for content for different demographic groups, for content for different genders, and so forth.

In this implementation, search engine 101 issues a number of search queries, over a period of time. Responses 110, 111 and 112 to the search queries identify content from different corpora that is relevant to respective search queries 102, 103 and 104. The scores of the identified content provide a quantifiable way of assigning a likelihood of relevance to the search query.

Different processes and different signals may be used to identify relevant content from different corpora. As a result, scores, e.g., relevance scores, for content from the different corpora may have different ranges, e.g., as determined by a ranking engine of the search engine 101. For example, content from a first corpus (e.g., a news feed corpus indexed by index 106) may have a range of relevance scores between a first number and a second number (e.g., one and two); content from a second corpus (e.g., a Web corpus indexed by index 107) may have a range of relevance scores between a third number and a fourth number (e.g., two and two thousand); content from a third corpus (e.g., a blog corpus indexed by index 108) may have a range of relevance scores between a fifth number and a sixth number (e.g., zero and five), and so forth for other corpora (not shown). Thus, in the above example, in Web corpus 107, content having a relevance score of ten may be deemed to have less relevance to the search query than content having a relevance score of one thousand. Similarly, in news feed corpus 106, content having a relevance score of 1.1 is deemed to have less relevance to the search query than content having a relevance score of one 1.9.

Because the relevance scores of the different corpora have different ranges, the absolute scores may have different meanings. In other words, a first score associated with content indexed for a first corpus may be identical to a second score associated with content indexed for a second corpus, but the first and second scores may indicate metrics on a different scale, e.g., they may indicate different likelihoods of relevance to the query. For example, among the three corpora shown in the example of FIG. 1, a relevance score of "2" for the news feed corpus 106 indicates most relevance; a relevance score of "2" for the Web corpus 107 indicates least relevance; and a relevance score of "2" for the blog corpus 108 indicates a relevance that is about in the middle of the relevance scale. Accordingly, when blending content from different corpora into an output, a direct comparison of relevance scores may not accurately reflect how relevant content from one corpus is relative to content from another, different corpus.

Accordingly, example system 100 normalizes relevance scores associated with content from different corpora 106, 107 and 108, and uses the normalized relevance scores in ranking the relevance of content from one corpus relative to the relevance of content from another corpus. In an example implementation, the relevance scores are examined, e.g., by a normalization engine 115, to identify the range of relevance scores for each corpus. Normalization engine 115 generates histograms 117, 118 and 119 for the relevance scores of respective corpora 106, 107 and 108. In some implementations, histograms are not generated; other distributions are used. In some implementations, the lower bound of each histogram corresponds to a relevance score of least relevance and an upper bound of each histogram corresponding to a relevance score of most relevance.

Example system 100 generates normalized relevance scores 120 based on the histograms. For example, histograms 117, 118 and 119 may be broken-down into portions, e.g., quantiles (which may represent, e.g., percentiles). In some implementations, the quantiles are generated from a distribution of relevance scores, rather than from histograms. The quantiles in each histogram may be mapped to corresponding quantiles in normalized relevance scores 120. In this implementation, the normalized relevance scores are between one and zero, with one indicating most relevance and zero indicating least relevance. Other appropriate ranges may be used.

Taking the relevance scores of Web corpus 107 as an example, a relevance score of two in Web corpus 107 maps to a zero in normalized relevance scores 120; a relevance score of two thousand maps to one in normalized relevance scores 120, and quantiles between two and two thousand map to corresponding quantiles in normalized relevance scores 120. Taking the relevance scores of news feed corpus 106 as another example, a relevance score of one in news feed corpus 106 maps to a zero in normalized relevance scores 120; a relevance score of two maps to one in normalized relevance scores 120, and quantiles between one and two map to corresponding quantiles in normalized relevance scores 120. This type of mapping may be performed for relevance scores from various different corpora.

The normalized relevance scores may be used to rank and blend content from the different corpora, e.g., to provide content from the different corpora in a ranked search results set. For example, the normalized relevance scores may be used in ranking content for output on a social network (e.g., in a content stream).

In a social network, content from different groups of entities may be ranked differently. For example, a first group of entities may include a searcher's contacts on a social graph; a second group of entities may include entities having more than a threshold number of connections on a social graph, e.g., celebrities, experts, and the like; and a third group of entities may include entities who are not connected to the searcher and who do not have at least the threshold number of connections. Membership in one of the groups of entities may affect the ranking score of content that is identified as relevant. So, for example, a ranking score of content from a member of the first group may be adjusted to make that content more relevant than, e.g., content having an equal relevance score but from a member of the second group. As a result, in some implementations, content from members of the first group may be ranked as being more relevant than content from members of the second group or from the third group; and content from members of the second group may be ranked as being more relevant than content from members of the third group.

In some example implementations, content that is ranked based on group of entities may be part of a content stream on a social network. The content stream may include content from other corpora, e.g., the corpora shown in FIG. 1.

In some example implementations, a model, e.g., a cost/gain model, may be used to determine how to add content, e.g., to search results or a content stream. An example cost/gain model may include identifying a point in ranked content where a ranking score falls below a threshold; determining whether to add content from outside the different categories (e.g., content from outside the social network) at the point where the ranking score falls below the threshold; and adding the content based on the determination. For example, a content score (which is separate from the ranking score) may be adjusted (e.g., incremented or decremented) each time content from outside the social network is added to a content stream. Content from outside the social network may include, e.g., content outside the users social graph, content outside the actual social networking service, content beyond a number of hops on the social graph, or the like. If this score exceeds a threshold, that content is not added. If the score is below the threshold, the content may be added, e.g., based on one or more additional rules. For example, there may be rule to add content from outside the social network after content from a first group of entities (e.g., a searcher's social contacts) has been exhausted, e.g., after search results beyond a threshold ranking in the category are no longer determined from an index.

The above processes are described in more detail below with respect to the flowcharts of FIGS. 4 to 7 below. The above process may be implemented in an appropriate network environment, with appropriate devices and computing equipment. An example of such an environment is described below.

Figure 2:
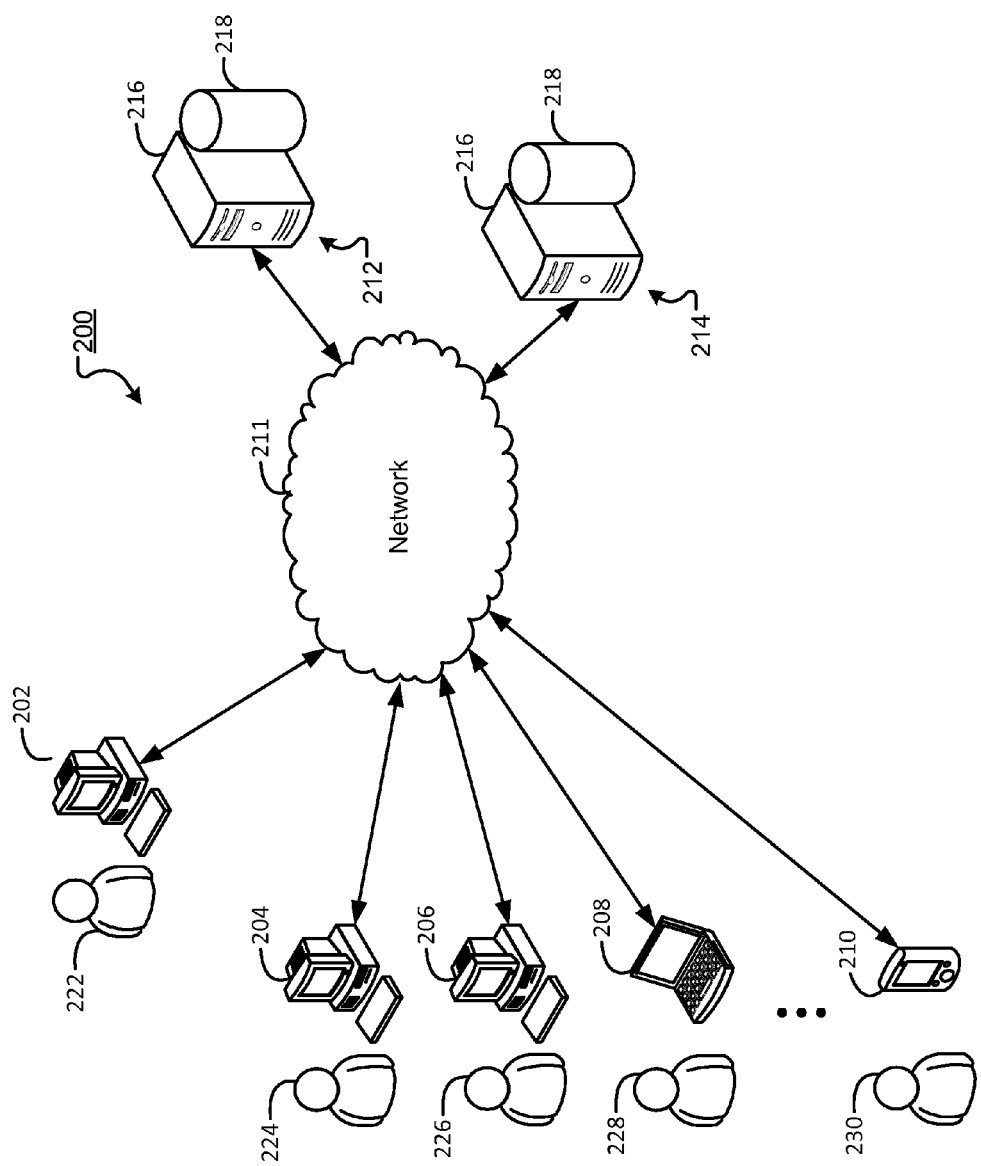
FIG. 2 is a block diagram showing an example network environment on which the process described herein for blending content may be implemented.

FIG. 2 is a block diagram showing an example network environment 200 on which the process described herein for blending content may be implemented. Network environment 200 includes computing devices 202, 204, 206, 208, 210 that can each communicate with a first server system 212 and/or a second server system 214 over a network 211. Each of computing devices 202, 204, 206, 208, 210 has a respective user 222, 224, 226, 228, 230 associated therewith. Each of first and second server systems 212, 214 includes a computing device 216 and a machine-readable repository, or database 218. Example environment 200 may include many thousands of Web sites, computing devices and servers, which are not shown.

Network 211 can include a large computer network, e.g., a local area network (LAN), wide area network (WAN), the Internet, a cellular network, or a combination thereof connecting a number of mobile computing devices, fixed computing devices, and server systems. The network(s) may provide for communications under various modes or protocols, e.g., Transmission Control Protocol/Internet Protocol (TCP/IP), Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, e.g., using a Bluetooth, WiFi, or other such transceiver.

Computing devices 202 to 210 enable users 222 to 230 to access and to view documents, e.g., Web pages included in Web sites. For example, user 222 of computing device 202 can view a Web page using a Web browser. The Web page can be provided to computing device(s) 202 to 210 by server system 212, server system 214 or another server system (not shown). In example environment 200, computing devices 202, 204, 206 are illustrated as desktop-type computing devices, computing device 208 is illustrated as a laptop-type computing device, and computing device 210 is illustrated as a mobile computing device. It is appreciated, however, that computing devices 202 to 210 can each be a type of computing device, examples of which include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of two or more of these data processing devices or other appropriate data processing devices. In some implementations, a computing device can be included as part of a motor vehicle (e.g., an automobile, an emergency vehicle (e.g., fire truck, ambulance), a bus).

Figure 3:
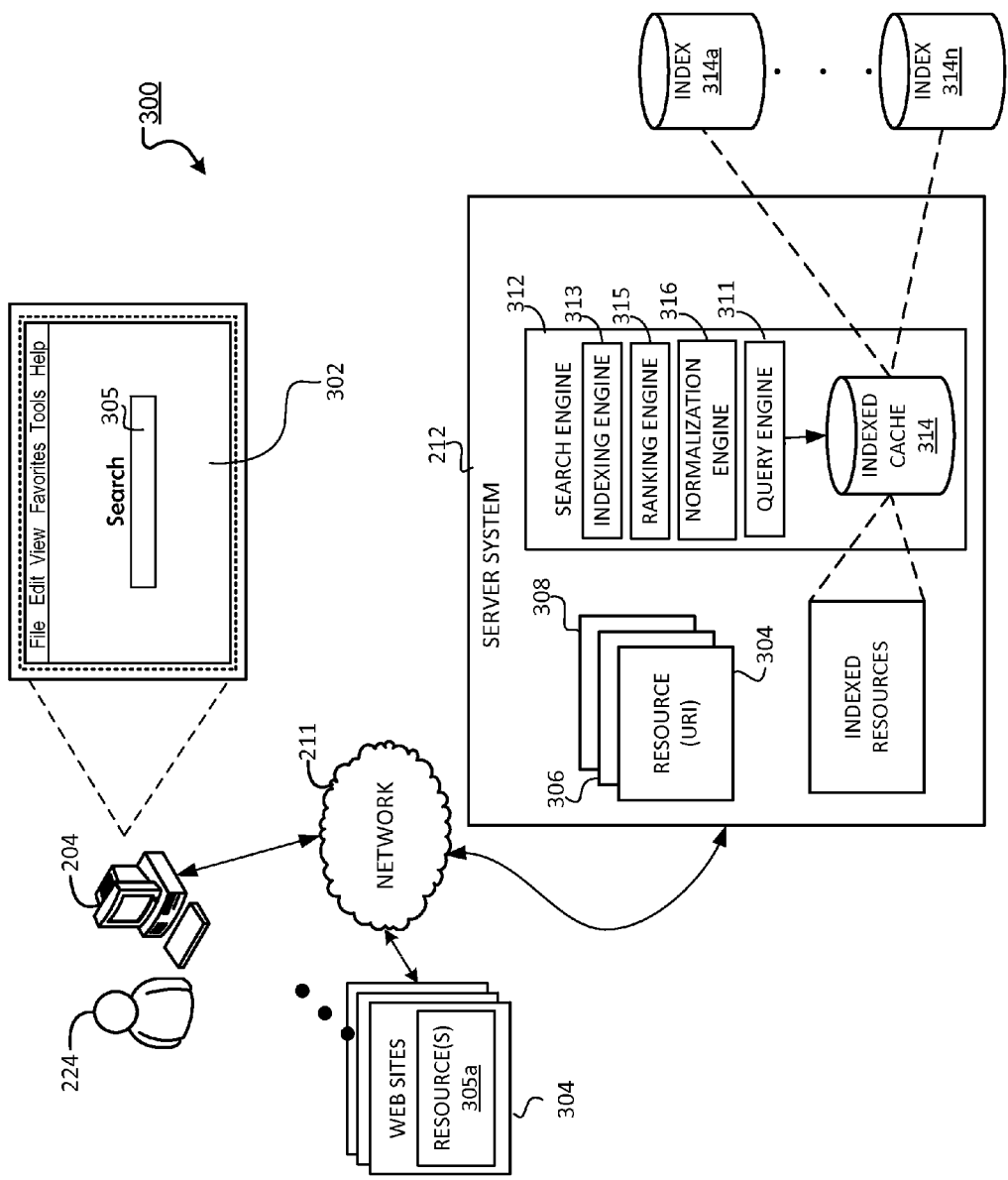
FIG. 3 is a block diagram of an example part of the network environment of FIG. 2.

FIG. 3 is a block diagram of an example part 300 of the network environment of FIG. 2. In FIG. 3, computing device 204 communicates with server system 212 to display a Web page 302 of a Web site. Specifically, server system 212 stores content resources 304, 306, 308, each of which includes an associated resource identifier (Resource ID). In some implementations, the resource 304, 306, 308 can each correspond to different Web pages of the same Web site, or can correspond to Web pages of different Web sites.

To view a Web page, user 224 can input or select a Resource ID using a browser that is executed on computing device 204. The Resource ID can include, e.g., a uniform resource indicator (URI) or a uniform resource locator (URL). A request including the Resource ID is transmitted from computing device 204 to server system 212 over network 211. In response, the server system identifies the requested resource based on the Resource ID, and transmits the resource to computing device 204 over network 211. For example, the resource may be a Web page, through which a user may access a search engine. The Web page may include a field 305 for inputting search terms that are transmitted to the search engine. In response, the search engine performs a search of an indexed cache, and returns a search results list to a user. The search results list may include, e.g., snippets including hyperlinks to content that is relevant to the search terms.

Network environment 200 includes a search engine 312 that identifies resources (e.g., 304, 306, 305a, 308) by crawling and indexing resources provided by content publishers. Search engine 312 may be implemented, e.g., on server system 212 as shown or on other appropriate hardware.

Search engine 312 may include an indexing engine 313 that indexes resources (e.g., Web content, images, new feeds, blogs, video, social network content, and so forth). In some implementations, privacy features provide a user with an opt-in or opt-out option to allow or to prevent, respectively, having their personal or private data indexed, having their social graph data being indexed, or being included (or removed the user if already included) as a member of another's social graph. Thus, users can have control over what personal information or connection information, if existing, is included in a search index.

Data about the resources can be indexed based on the resource to which the data corresponds. The indexed and, optionally, cached copies of the resources can be stored in an indexed cache 314. Social graph information, an example of which is described below, can be included in a same index as other resources or in a separate index (not shown). In some implementations, indexed cache 314 may contain separate search indexes 314a to 314n for different corpora, e.g., those shown in FIG. 1. In other implementations, there may be a separate indexed cache (not shown) for each of the different corpora.

A query engine 311 issues queries to the indexed cache. A normalization engine 316 normalizes relevance scores for different corpora. A ranking engine 315 ranks resources that match the queries. In some implementations, normalization engine 316 is part of search engine 312. In some implementations, normalization engine 316 is not part of search engine 312.

In response to a search query, search engine 312 can access indexed cache 314 to identify resources that are relevant to the search query. Search engine 312 identifies resources in the form of search results and returns the search results to a requesting device in search results pages. A search result may be data generated by search engine 312 that identifies a resource, and that includes a hyperlink to the corresponding resource. An example search result can include a title, a snippet of text or a portion of an image extracted from the Web page, and the URL (Unified Resource Location) of the Web page.

Search engine 312 may take into account social affinities that the user has to others when obtaining and ranking search results. For example, a user's affinity to another party may be used to adjust (e.g., increase or decrease) the ranking score of search results related to that party. In some implementations, affinity is used to affect the ranking of content from different corpora. For example, affinity may be used to adjust ranking scores of content in the context of searching a social network.

In a social networking context, affinity can identify the closeness of a party to a user. For example, a contact of a contact who has five common middle contacts with the user has more of an affinity with the user (e.g., is considered closer to the user) than a contact of a contact who has only one common middle contact. Factors in determining affinity can include, e.g.: how a contact is connected to the user (e.g., a source of a connection), which social networking site the contact is a member of, whether contact or contact of contact, and how many paths to get to the contact of a contact (e.g., common middle contacts).

Affinity can also be based on the user's interactions with members of a user's social graph (e.g., the frequency of interaction, the type of interaction, and so forth). For example, a user that frequently clicks on posts by a particular contact can be considered to be closer to that contact than with other contacts where they click on respective posts less frequently. Likewise, if a user frequently "mouses-over" content by an author (e.g., a search result link), but does not select that content, the degree of affinity may be less than if the link is selected. Similarly, an amount of time viewing content may be an indicator that one party likes content from another party. The amount of time viewing particular content may be an indication that one party likes only that particular type of content from the other party.

In other examples, affinity can be defined by indirect interaction between users. For example, if two users interact with the same content regularly or frequently, those two users may be considered to have an affinity with each other. In still other examples, if two users interact with the same people regularly or frequently, those two users may be considered to have an affinity with each other.

Affinity can also be greater for particular types of interactions, for example, comments on contact's posts can result in a closer social connection than occasional endorsements. Affinity can change over time. For example, as the types or frequency of interactions change with members of the social graph, the resulting affinities can change as well. A social graph is one way to represent affinity between two parties, which may, or may not, be on the same social network. A social graph is an association of connections among users and content, which may be depicted graphically. Types of connections in social graphs can include, but are not limited to, other users to which a user is in direct contact (e.g., user mail or chat contact, direct contacts on social sites) and users to which the user is in indirect contact (e.g., contacts of contacts, connections of users that have a direct connection to the user). In some implementations, a direct connection may be unilateral or bilateral. In some implementations, a social graph includes content generated by individuals (e.g., blog posts, reviews) as connections to the user. The social graph can include connections within a single network or across multiple networks.

Figure 4:
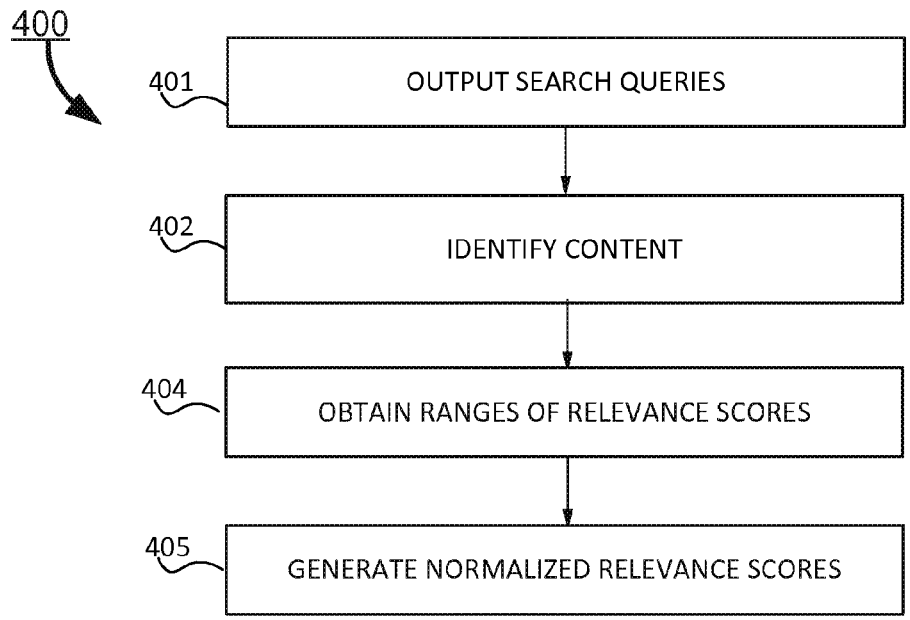
FIG. 4 is a flowchart showing an example process for normalizing relevance scores associated with content from corpora of a search index.

FIG. 4 is a flowchart showing an example process 400 for normalizing relevance scores associated with content from different corpora of a search index. Process 400 may be performed, e.g., by query engine 311 and normalization engine 316.

Process 400 (e.g., query engine 311) outputs (401) search queries. In some implementations, those search queries may have been formulated to identify search results having a range of relevance. For example, search engine 312 may issue, to each corpus 106, 107 and 108, a number of search queries over a course of time. The search queries may be corpus-specific or general. For example, search queries for news feed corpus 106 may contain content (e.g., key words, images, video, audio or the like) associated with current events, e.g., content that is close to a top range of relevance scores for news feed corpus 106. Queries may also be formulated to search for content that is unrelated to news, e.g., in order to identify content that is close to the bottom of the range of relevance scores for the news feed corpus.

Process 400 identifies (402) content from each corpus in response to the output (401) search queries. To identify content, process 400 generates relevance scores for the content from the various different corpora. As explained above, different mechanisms (e.g., different signals) may be used to identify relevant content from the different corpora.

Process 400 (e.g., normalization engine 316) examines the relevance scores for the identified content to obtain (404) ranges for the relevance scores for the various corpora. For example, process receives the relevance scores, and identifies upper and lower bounds of the relevance scores for each corpus. In some implementations, the lower bound may be the lowest relevance score received in response to a search query. In some implementations, the upper bound may be the highest relevance score received in response to a search query. The range of relevance scores for each corpus may be between the corresponding upper and lower bounds, with the upper and lower bounds being included in the range.

Process 400 (e.g., normalization engine 316) generates (405) normalized relevance scores. To this end, process 400 generates histograms (or other distribution(s)) corresponding to the ranges of relevance scores associated with each of the corpora. For example, as explained above, content from news feed corpus 106 may have a range of relevance scores between one and two; content from Web corpus 107 may have a range of relevance scores between two and two thousand; content from blog corpus 108 may have a range of relevance scores between zero and five, and so forth for other corpora (not shown).

Process 400 identifies quantiles in each of the histograms (or other distribution(s)). The quantiles may be, e.g., percentiles. For example, the quantiles may indicate where, along a continuum between the upper and lower bounds a relevance score falls. For example, if a subject relevance score is in the exact middle between the upper and lower bounds (e.g., there are an equal number of relevance scores below the subject relevance score and an equal number of relevance scores above the subject relevance score), then the subject relevance score will be in the middle quantile (e.g., the $50^{th}$ percentile). Process 400 uses this information to normalize the relevance scores of the corpora. In this implementation, normalizing includes mapping the relevance scores of the different corpora (which have different ranges) to a common range of relevance scores. In this implementation, the normalized relevance scores have values between zero and one; however, other appropriate scales may be used.

By way of example, a relevance score of two in Web corpus 107 maps to a zero normalized relevance score; a relevance score of two thousand maps to a one normalized relevance score, and quantiles between two and two thousand map to corresponding quantiles in normalized relevance scores 120. Similar mappings are performed for other corpora. Appropriate mechanisms may be used to map the corpus-specific relevance scores to the normalized relevance scores. For example, a mathematical relationship may be established to perform the mapping. A look-up table, or set thereof, may be used to perform the mapping. Pointers may be used to perform the mapping. Other mappings mechanisms also may be used.

Process 400 may be repeated periodically, e.g., to automatically update and refine the normalized relevance scores. The automatic updating may occur, e.g., at predefined time intervals, in response to a predefined amount of change in a corpus, or in response to other events. Furthermore, when additional corpora are added to the system, process 400 may be repeated for those corpora. The updating/refining can be considered automatic because it may be performed without further user intervention The normalized relevance scores and mapping mechanisms may be stored, e.g., in a database in server system 212 that is accessible to search engine 312. In some example implementations, that database may be part of indexed cache 314.

Figure 5:
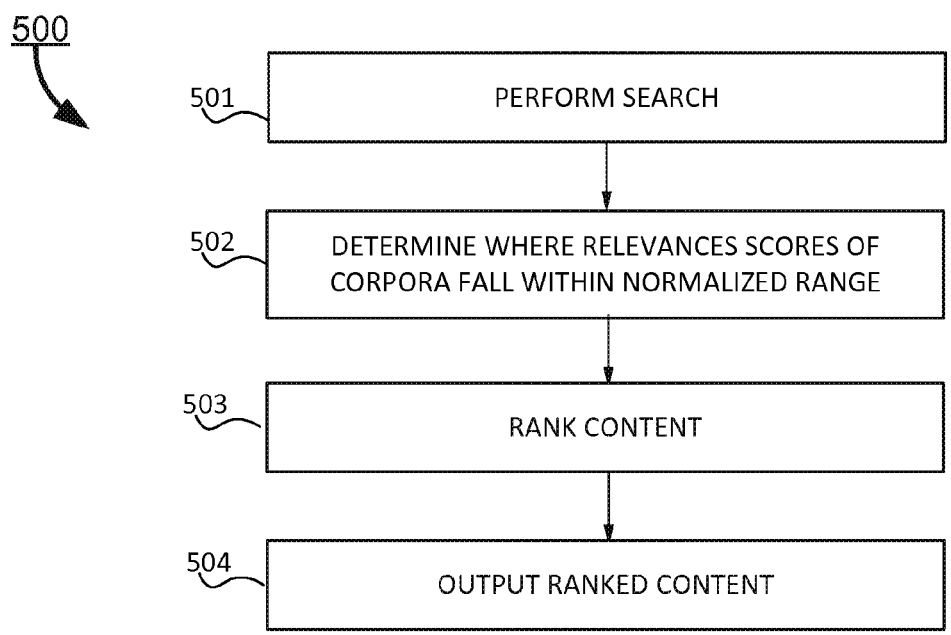
FIG. 5 is a flowchart showing an example process for using the normalized relevance scores to obtain blended search results.

FIG. 5 is a flowchart showing an example process 500 for using the normalized relevance scores to obtain blended search results. In this implementation, "blended' refers to search results that are from different corpora. The relevance scores are associated with content from corpora of a search index. Process 500 may be performed, e.g., by query engine 311, ranking engine 315, and normalization engine 316.

Process 500 performs (501) a search of indexes for different corpora in response to an input search query. The input search query may include content (e.g., key words, images, video, audio or the like) that can form the basis of a search. As part of the search, process 500 obtains relevance scores for content from the different corpora that were searched. The relevance scores have different ranges, as explained above. Accordingly, process 500 determines (502) where, in the range of normalized relevance scores, the relevance scores from the various corpora fall. To do this, process 500 may use a mapping mechanism, examples of which are described above.

Process 500 thus obtains the normalized relevance scores for the search results from the different corpora. Process 500 uses these normalized relevance scores to rank (503) the content from the different corpora. More specifically, since the relevance scores from the different corpora are normalized (e.g., mapped to the same scale, e.g., zero to one), the relevance scores for the different corpora can be compared to each other, and used in ranking the search results from the different corpora. Following ranking, process 500 outputs (504) the ranked content as search results. The output search results are blended in the sense that they include content (e.g., snippets) from the different corpora. The content from the different corpora may be intermingled in the ranked search results. For example, the output search results may include content from new feed corpus 106, followed by content from Web corpus 107, followed by content from blog corpus 108, and so forth.

Process 500 includes similar operations for outputting ranked content to a content stream. In the content stream example, there may not be an initial search query from a user, however. For example, metrics may be used to identify relevant content from the various corpora, and the processes explained with respect to FIGS. 4 and 5 may be used to normalize relevance scores and output appropriate content in the content stream.

Figure 6:
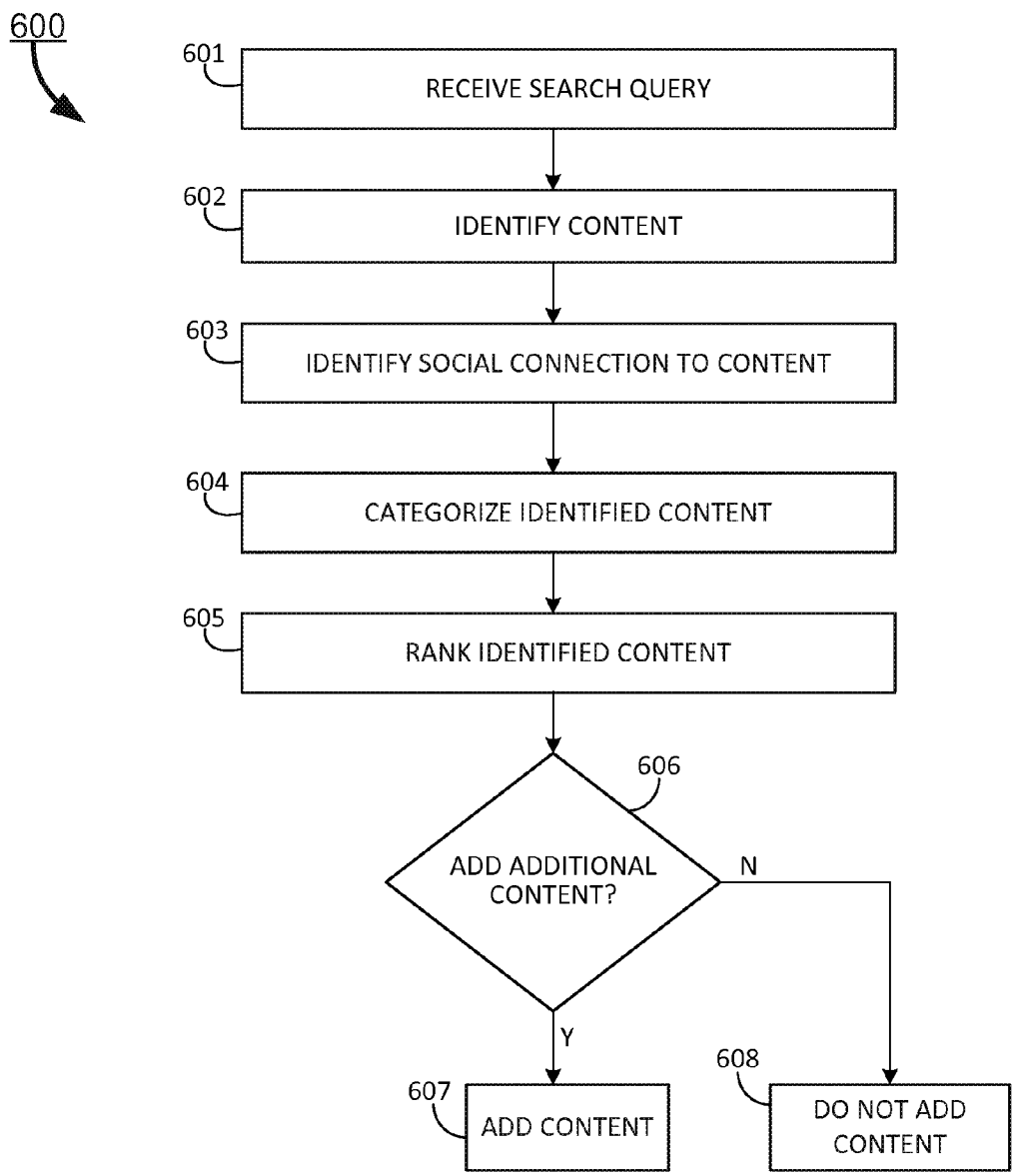
FIG. 6 is a flowchart showing an example process for ranking content based on categories.

FIG. 6 is a flowchart showing an example process 600 for ranking content based on categories. Process 600 may be performed, e.g., by ranking engine 315 and other components of search engine 312

Process 600 receives (601) a search query, e.g., from a computing device of a searcher. The search query may include content (e.g., key words, images, video, audio or the like) that can form the basis of a search. Search engine 312 identifies (602) content, e.g., from indexed cache 314 that may be relevant to the received search query. The content may be identified, e.g., based on relevance to the content of the search query. At least some of the identified content may be from content from a social network, of which the searcher is a member. In that social network, the searcher may be connected, on their social graph, to other entities. For example, the searcher may have actively established contacts to entities on the social network (e.g., by following feeds from those entities) or the searcher may have passively established contacts to entities, e.g., by reading a blog on a regular basis.

Data identifying the searcher's social connection to other entities, or lack thereof, may be contained within a search index, e.g., indexed cache 314. For example, content in the search index may, e.g., identify an entity associated with that data. As noted above, in some implementations, privacy features provide a user with an opt-in or opt-out option to allow or to prevent, respectively, having their personal or private data indexed, and having their social graph data being indexed. Thus, users can have control over what personal information or connection information, if existing, is included in a search index. An association may indicate, e.g., that the entity authored the content, shared the content, commented on the content, uploaded the content, endorsed the content, sent the content to their contacts, or performed other actions with respect to the content. The searcher's social graph may be consulted, as part of process 600, to determine whether the entity associated with the identified content has, or does not have, a social connection to the searcher.

In some implementations, the social graph may include edges between connected entities. The edges may indicate a connection, and may be traversed in order to identify the connection. The edges may be weighted or be associated with other metric(s) that indicate a strength of the social connection made by the edge. When determining whether two entities (e.g., a searcher and an entity that shared content) are connected, process 600 may traverse the social graph in order to determine if there is a direct connection between the entities or an indirect connection between the entities. A direct connection may include, e.g., a single edge that connects first and second entities. An indirect connection may include, e.g., a third entity that is between the first and second entities on the social graph. In other words, it is possible to traverse the social graph from the first entity to reach the second entity, and thereby establish a social connection; however, the traversal passes through the third entity. For example, traversal may start at the first entity, pass through one or more edges to the third entity, reach the third entity, and then pass through one or more edges to reach the second entity. Thus, although they are not directly connected, the first and second entities have an indirect connection.

Indirect connection may be limited, e.g., to entities that are within a certain degree of separation (e.g., four nodes) from the searcher. In some implementations, it may be determined that, although there is an indirect connection between first and second entities through, e.g., five nodes, that a fifth degree of separation is too far and therefore, not considered a social connection. In other examples, there may be no limits relating to degrees of separation.

For the content identified (602) in the search, process 600 also identifies (603) the searcher's social connection to that content, e.g., by traversing the searcher's social graph in a manner explained above. Process 600 categorizes (604) the identified content by group of entitles that is associated with that content. Information obtained from the searcher's social graph may be used to categorize the content. In an example, the content is split among plural (e.g., three) different categories based on a social relationship between the searcher and an entity associated with that content (e.g., an entity that authored the content, shared the content, commented on the content, uploaded the content, endorsed the content, sent the content to their contacts, or performed other actions with respect to the content). In some implementations, the different categories include, but are not limited to, a first category corresponding to entities who have a social connection to the searcher, a second category corresponding to entities having greater than a threshold number of connections on their social graphs, and a third category corresponding to entities that do not have a social connection to the searcher (or, e.g., whose social connection to the searcher is beyond an acceptable degree of separation, e.g., four nodes on the social graph or other numbers of hops on the social graph). In some implementations, the second category may include, e.g., celebrities, public figures, experts on a particular topic, and so forth.

Process 600 (e.g., ranking engine 315) ranks (605) the identified content, at least in part, based on the category in which that content is found. The ranking may also be based on normalized relevance scores of the type described above. In the above example, process 600 may adjust the ranking score of content from the first category so that content from the first category is more relevant than both content from the second category and content from the third category; and process 600 may adjust the ranking score of content from the second category so that content from the second category is more relevant than content from the third category. Thus, in this implementation, process 600 ranks content from social contacts as being more relevant that content from celebrities, public figures, or the like (e.g., those having extensive social contacts). Also in this implementation, process 600 ranks content from celebrities, public figures, or the like as being more relevant that content from entities that have no social connection to the searcher, but, e.g., who may be on the same social network as the searcher.

In some implementations, the category in which the content falls may influence the ranking score, but is not dispositive in terms or ranking. For example, the ranking score of the content in the first category may be adjusted by a first amount and the ranking score of content in the second category may be adjusted by a second amount that is less than the first amount (e.g., with the ranking score of content in the third category not being adjusted). As a result, in this implementation, content from the first category may not always be ranked above content from the second category. For example, other factors, e.g., relevance to an input search query, have an affect on the ranking score that may cause the content from the second category to be ranked as more relevant than content from the first category despite the system preference for content from the first category.

Process 600 determines (606) whether to add, into the ranked content (e.g., search results or a content stream), content from other corpora, e.g., from outside of the social network. For example, process 600 may add Web content that is relevant to a search query input to a social network, where the searcher has no social connection to that Web content. An example process for determining whether to add additional content is explained below with respect to FIG. 7. If it is determined to add the additional content, then that content is added (607) at an appropriate point in the ranked content. If it is determined not to add the additional content, that content is not added (608) to the ranked content.

Figure 7:
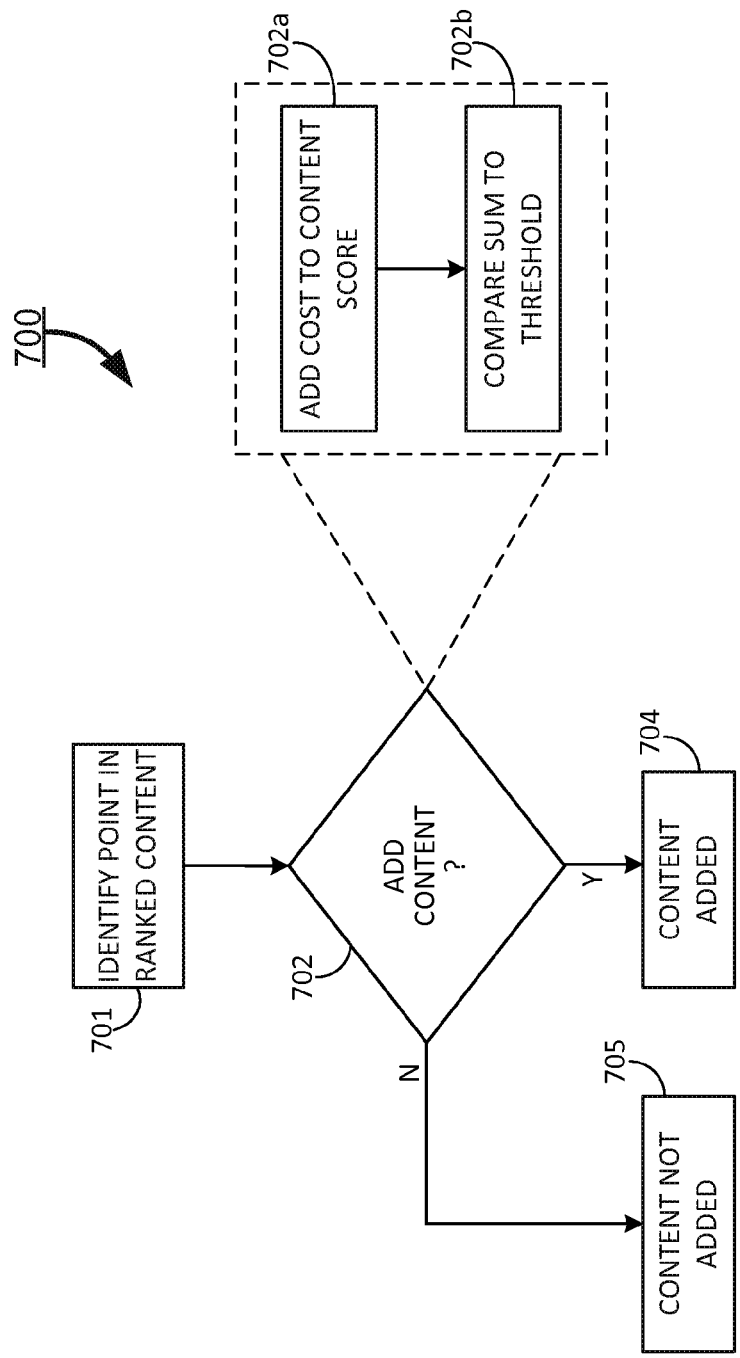
FIG. 7 is a flowchart showing an example process for adding additional content to ranked results.

FIG. 7 is a flowchart showing an example process 700 for adding additional content to ranked results, e.g., a content stream, search results, or the like. Process 700 may be performed, e.g., by ranking engine 315 and other components of search engine 312

In this implementation, process 700 adds, to the ranked content, content from outside of the different categories (e.g., public Web content that is relevant to a search query or topic). This example process for adding such content limits the amount of such content that may be added. For example, the process may include maintaining a content score that is different from the ranking score and that is based on costs (e.g., numerical values) associated with the content to be added; and adding, to the ranked content, content from outside of the different categories in a case that the content score does not exceed a threshold.

More specifically, referring to FIG. 7, process 700 identifies (701) a point in the ranked content where the additional content is to be added. In some implementations, this point in the ranked content may be where the ranking score of the content falls below a threshold. For example, the ranking scores of the ranked content may be examined to identify an appropriate point. Continuing with the above example, that point may be, e.g., the point where content from the first category is exhausted or the point where content from the first and second categories are exhausted.

Process 700 determines (702) whether to add the additional content at the identified point. In this regard, process 700 maintains a content score, which may be adjusted (e.g., incremented or decremented) based on the addition of content to the ranked content. The content score may be a running score, at least for a segment of the ranked content, in the sense that it is keeps track of items of content that were previously added to the segment of ranked content. A segment of the ranked content may include, e.g., a ranked subset of the ranked content. So, for example, if no additional content is added to, e.g., the first fifty search results (which is an example segment of search results), the content score may be zero. Additional items of content may have a cost of "one". When a new item of content is added to that first fifty search results, the content score may be incremented. So, for example, if the content score is currently ten, in this implementation that means that, previously, ten items of content were added to the first fifty search results. A different content score may be tracked for each segment of the search results. The segments may have the same size (e.g., the same number of search results) or have different sizes.

Costs associated with the content score may not be the same over the course of the ranked content. For example, a cost associated with adding content at a top ranked position in the ranked content may be greater than a cost associated with adding that same content at other positions in the ranked content. For example, if the additional content is to be added at a top ranked position, e.g., at the beginning of a content stream, there may be a cost of ten, instead of one, for adding the content at that position. Depending upon the value of the threshold, as described below, such an addition may or may not be permitted.

The cost to add content may further vary, e.g., based on previously-added content items. For example, the cost to add a first content item in a sequence may be one; the cost to add a second item in that sequence may be five; the cost to add a third item in that sequence may be ten, and so forth. In this implementation, the costs may vary so as to reduce the chances that multiple content items from outside the categories noted above will be present in sequence in the ranked content.

The costs for different content from the different corpuses may vary depending on what is already included in the search results. This may help to diversify the types of search results. For example, the first five news items may have a cost of one; the sixth news item may have a cost of two; and a following blog item may add a cost of one (since the blog item is in a different category from the preceding six news items). In other words, in this implementation, the cost of adding a content item (e.g., a search result) may be dependent upon preceding added content. So, in another example, if the preceding content is content to which the user has a social affinity (e.g., content from the user's social graph), the addition of content, e.g., from a Web page may have a cost of one, whereas that same content following other Web pages may have a cost of two, three, four, or more.

In some implementations, the additional content is added according to its ranking score. For example, first content, which is ranked as more relevant than second content, may be added first, followed by the second content, and so forth. In some implementations, content having a relevance score that is above a threshold may be added to the ranked results regardless of its cost.

In some implementations, the additional content may include search results that correspond to relevant content from outside the social network of the searcher. More specifically, the search engine may obtain search results for content to which the searcher has a social affinity, and content to which the searcher does not have a social affinity. The content to which the searcher does not have a social affinity may be added, e.g., to a set of ranked results, to a content stream, or the like, in the manner described with respect to FIGS. 7 and 8.

Figure 8:
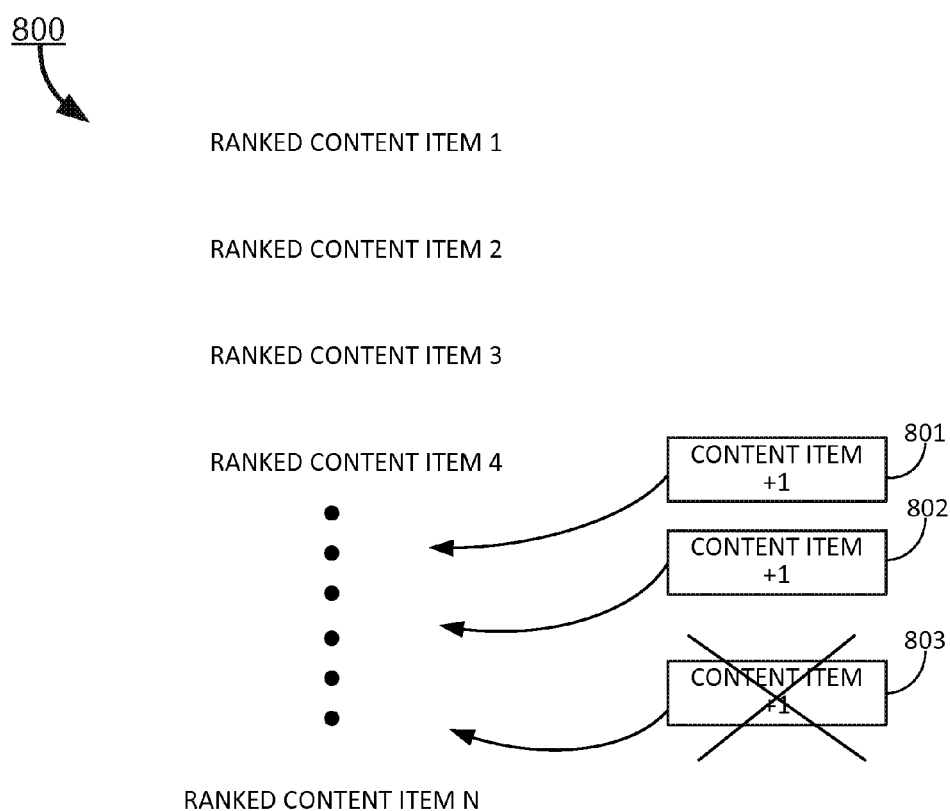
FIG. 8 shows, conceptually, an example of adding content to ranked results.

Referring to FIG. 8, process 700 determines, e.g., whether to add additional content item 801 to the ranked content items 800.

In this implementation, process 700 adjusts (702*a*) (e.g., adds), the content score for content items 800, using the cost associated with the additional content, and compares (702*b*) the resulting cost (e.g., sum of the costs) to the threshold. If the sum is at or below the threshold, then the content may be added (704). If the sum exceeds the threshold, then the content is not added (705).

By way of example, referring to FIG. 8, the running content score is eight and the threshold is ten. In this implementation, addition of content item 801, which has a cost of one (labeled "+1" in the figure), pushes the content score to nine, which is below the threshold, so content item 801 is added. In this implementation, addition of content item 802, which has a cost of one, pushes the content score to ten, which is at the threshold, so content item 802 is added. In this implementation, addition of content item 803, which has a cost of one, pushes the content score to eleven, which is above the threshold, so the addition of content item 803 is prohibited. This is depicted in FIG. 8 by an "X" through content item 803.

The content added through processes 600 and 700 may be content from different corpora, examples of which are shown in, and described with respect to, FIG. 1. In this regard, process 400 of FIG. 4 may be used to normalize the relevance scores of content from the different corpora. Thereafter, the content may be ranked for addition to the ranked content in accordance with processes 600 and 700. For example, additional content that is ranked as most relevant may be added first to the ranked results. Ranking may take into account the corpus from which the content is obtained. For example, if a search query identifies an online video blogger, the ranking score of content from a corpus containing video may adjusted (e.g., increased). As a result of this adjustment to the ranking score, content from that corpus may be ranked as being more relevant than content from other corpora.

Figure 9:
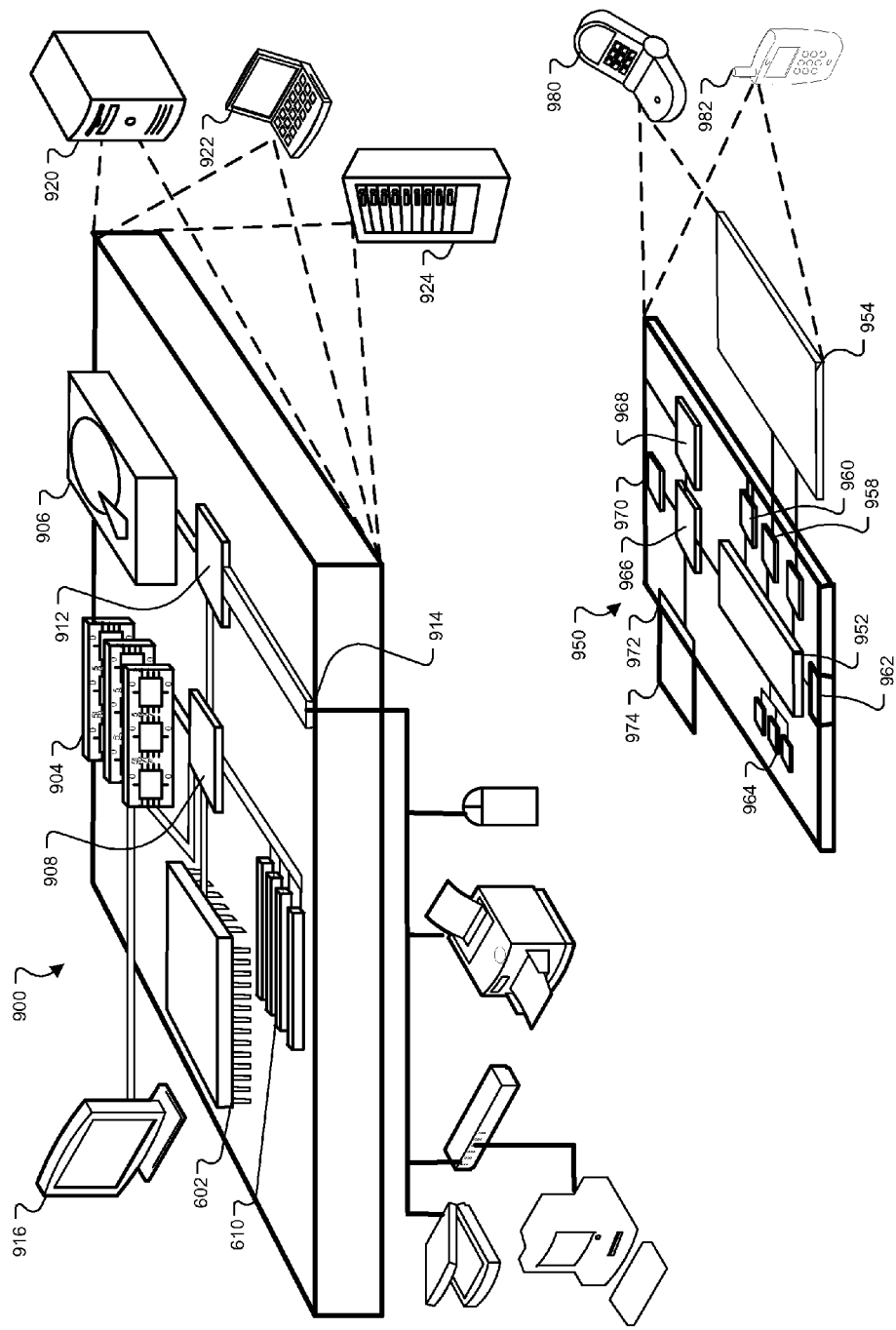
FIG. 9 shows examples of computing devices on which the processes described herein, or portions thereof, may be implemented.

FIG. 9 shows examples of computing devices on which the processes described herein, or portions thereof, may be implemented. In this regard, FIG. 9 shows an example of a generic computing device 900 and a generic mobile computing device 950, which may be used to implement the processes described herein or portions thereof. For example, search engine 312 may be implemented on computing device 900. Mobile computing device 950 may represent a client device of FIG. 2. Other client devices of FIG. 2 may also have the architecture of computing device 900.

Computing device 900 is intended to represent various forms of digital computers, examples of which include laptops, desktops, workstations, personal digital assistants, servers, blade servers, mainframes, and other appropriate computers. Computing device 950 is intended to represent various forms of mobile devices, examples of which include personal digital assistants, cellular telephones, smartphones, and other similar computing devices. The components shown here, their connections and relationships, and their functions, are meant to be exemplary only, and are not meant to limit the scope of the appended claims.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, for example, display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, examples of which include a magnetic or optical disk.

The storage device 906 is capable of providing mass storage for the computing device 900. In one implementation, the storage device 906 may be or contain a computer-readable medium, for example, a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, including those described above. The information carrier may be a non-transitory computer- or machine-readable medium, for example, the memory 904, the storage device 906, memory on processor 902, or a propagated signal. For example, the information carrier may be a non-transitory, machine-readable storage medium.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, examples of which include a keyboard, a pointing device, a scanner, or a networking device, for example, a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer, for example, a laptop computer 922. Alternatively, components from computing device 900 may be combined with other components in a mobile device (not shown), for example, device 950. Each of such devices may contain one or more of computing device 900, 950, and an entire system may be made up of multiple computing devices 900, 950 communicating with each other.

Computing device 950 includes a processor 952, memory 964, an input/output device for example, a display 954, a communication interface 966, and a transceiver 968, among other components. The device 950 may also be provided with a storage device, for example, a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, for example, control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided by the SIMM cards, along with additional information, for example, placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, examples of which include those described above. The information carrier is a computer- or machine-readable medium, for example, the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, examples of which include GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, for example, using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, for example, through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

For situations in which the systems discussed herein collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (for example, to a city, zip code, or state level), so that a particular location of the user cannot be determined.

The processes described herein and variations thereof contain functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

In the context of this disclosure, the terms social network and social networking service may be used interchangeably.

In addition to ranking based on normalized relevance scores, ranking scores of the type described herein may also be based on one or more other factors including, but not limited to: searcher location; expected location of a content item; time and date (e.g., favoring different results depending on a searcher's local time, thereby distinguishing, e.g., between cases where the searcher is at work and cases where the searcher is not at work or engaging in entertaining activities; the day of the year, e.g., to promote certain results near major holidays; days special to the searcher, e.g., the searcher's birthday, the searcher's friends' birthdays, etc.; time decay according to searcher preference and topic trends; etc.); and the searcher's explicit and implicit actions, where "explicit" includes, e.g., searcher's previous content selections, e.g., to promote or demote search results on a next page based on searcher's interactions with search results on a previous page, and where "implicit" includes, e.g., demographics associated with the searcher and prior searches that the searcher has performed. As noted above, the searcher may opt-out of having private information or public information about themselves collected and incorporated into a search index.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

Other implementations not specifically described herein are also within the scope of the following claims.

What is claimed is:

1. A method comprising:
   obtaining ranges of content relevance scores for different collections of content;
   generating a normalized range of normalized values based on the ranges of content relevance scores;
   normalizing a particular range of a particular collection of content by
   generating a distribution of content relevance scores for the particular collection of content;
   dividing the distribution into first subsets, with a first subset including a portion of the content relevance scores in the distribution;
   dividing the normalized range into a plurality of second subsets, with a second subset including one or more of the normalized values;
   generating a mapping of the first subsets to the second subsets;
   selecting a content relevance score from the distribution;
   determining one of the first subsets that includes the content relevance score selected;
   determining one of the second subsets that is mapped to the one of the first subsets;
   identifying a normalized value included in the one of the second subsets; and
   updating the content relevance score with the normalized value;
   performing searches of the different collections of content to identify content that is relevant to a search query;
   determining where, in the normalized range, content relevance scores corresponding to the identified content fall;
   ranking the identified content based, at least in part, on where the content relevance scores fall in the normalized range; and
   outputting at least part of the identified content based the ranking.

2. The method of claim 1, wherein obtaining the ranges comprises:
   running sample search queries over the different collections of content;
   receiving the content relevance scores in the ranges in response to the sample search queries; and
   identifying upper and lower bounds of the content relevance scores for each of the different collections of content, wherein a range of content relevance scores for a corresponding collection of content is between, and inclusive of, values corresponding to the upper and lower bounds of the content relevance scores.

3. The method of claim 1, further comprising:
   obtaining updated ranges of content relevance scores at predetermined time intervals; and
   updating the normalized range based on the updated ranges.

4. The method of claim 1, further comprising:
   obtaining updated ranges of content relevance scores based on changes to the different collections of content; and
   updating the normalized range based on the updated ranges.

5. The method of claim 1, wherein the different collections of content correspond to corpora for at least some of the following: news content, video content, blog content, social networking content, and Web content.

6. The method of claim 5, wherein the corpora include at least one of: content from a country, content in a language, content for a demographic group, and content for a gender.

7. The method of claim 1, wherein the at least part of the identified content comprises one or more snippets of the identified content.

8. The method of claim 1, wherein a subset comprises a percentile.

9. The method of claim 1, further comprising:
   ranking, based on normalized ranges for the different collections, the content in the different collections; and generating, at least partly based on the ranking, blended content that includes at least a first item of content from a first one of the collections and a second item of content from a second one of the collections, with the first one of the collections differing from the second one of the collections.

10. One or more non-transitory machine-readable media comprising instructions that are executable to perform operations comprising:
   obtaining ranges of content relevance scores for different collections of content;
   generating a normalized range of normalized values based on the ranges of content relevance scores;
   normalizing a particular range of a particular collection of content by
      generating a distribution of content relevance scores for the particular collection of content;
      dividing the distribution into first subsets, with a first subset including a portion of the content relevance scores in the distribution;
      dividing the normalized range into a plurality of second subsets, with a second subset including one or more of the normalized values;
      generating a mapping of the first subsets to the second subsets;
      selecting a content relevance score from the distribution;
      determining one of the first subsets that includes the content relevance score selected;
      determining one of the second subsets that is mapped to the one of the first subsets;
      identifying a normalized value included in the one of the second subsets; and
      updating the content relevance score with the normalized value;
   performing searches of the different collections of content to identify content that is relevant to a search query;
   determining where, in the normalized range, content relevance scores corresponding to the identified content fall;
   ranking the identified content based, at least in part, on where the content relevance scores fall in the normalized range; and
   outputting at least part of the identified content based the ranking.

11. The one or more non-transitory machine-readable media of claim 10, wherein obtaining the ranges comprises:
   running sample search queries over the different collections of content;
   receiving the content relevance scores in the ranges in response to the sample search queries; and
   identifying upper and lower bounds of the content relevance scores for each of the different collections of content, wherein a range of content relevance scores for a corresponding collection of content is between, and inclusive of, values corresponding to the upper and lower bounds of the content relevance scores.

12. The one or more non-transitory machine-readable media of claim 10, wherein the operations further comprise:
   obtaining updated ranges of content relevance scores at predetermined time intervals; and
   updating the normalized range based on the updated ranges.

13. The one or more non-transitory machine-readable media of claim 10, wherein the operations further comprise:
   obtaining updated ranges of content relevance scores based on changes to the different collections of content; and
   updating the normalized range based on the updated ranges.

14. The one or more non-transitory machine-readable media of claim 10, wherein the different collections of content correspond to corpora for at least some of the following: news content, video content, blog content, social networking content, and Web content.

15. The one or more non-transitory machine-readable media of claim 14, wherein the corpora includes at least one of: content from a country, content in a language, content for a demographic group, and content for a gender.

16. The one or more non-transitory machine-readable media of claim 10, wherein the at least part of the identified content comprises one or more snippets of the identified content.

17. A system comprising:
   one or more processing devices; and
   one or more non-transitory machine-readable media storing instructions that are executable by the one or more processing devices to perform operations comprising:
      obtaining ranges of content relevance scores for different collections of content;
      generating a normalized range of normalized values based on the ranges of content relevance scores;
      normalizing a particular range of a particular collection of content by
         generating a distribution of content relevance scores for the particular collection of content;
         dividing the distribution into first subsets, with a first subset including a portion of the content relevance scores in the distribution;
         dividing the normalized range into a plurality of second subsets, with a second subset including one or more of the normalized values;
         generating a mapping of the first subsets to the second subsets;
         selecting a content relevance score from the distribution;
         determining one of the first subsets that includes the content relevance score selected;
         determining one of the second subsets that is mapped to the one of the first subsets;
         identifying a normalized value included in the one of the second subsets; and
         updating the content relevance score with the normalized value;
      performing searches of the different collections of content to identify content that is relevant to a search query;
      determining where, in the normalized range, content relevance scores corresponding to the identified content fall;
      ranking the identified content based, at least in part, on where the content relevance scores fall in the normalized range; and
      outputting at least part of the identified content based the ranking.

18. The system of claim 17, wherein obtaining the ranges comprises:
   running sample search queries over the different collections of content;
   receiving the content relevance scores in the ranges in response to the sample search queries; and
   identifying upper and lower bounds of the content relevance scores for each of the different collections of content, wherein a range of content relevance scores for a corresponding collection of content is between, and inclusive of, values corresponding to the upper and lower bounds of the content relevance scores.

19. The system of claim 17, wherein the operations further comprise:
   obtaining updated ranges of content relevance scores at predetermined time intervals; and
   updating the normalized range based on the updated ranges.

* * * * *